United States Patent [19]

Hedgcock et al.

[11] 4,166,661
[45] Sep. 4, 1979

[54] BEARING RETAINER

[75] Inventors: Richard L. Hedgcock, East Peoria; Arthur J. Ritter, Jr., Metamora, both of Ill.

[73] Assignee: Caterpillar Tractor Co., Peoria, Ill.

[21] Appl. No.: 950,421

[22] Filed: Oct. 11, 1978

Related U.S. Application Data

[63] Continuation of Ser. No. 800,823, May 26, 1977, abandoned.

[51] Int. Cl.² .............................................. F16C 35/00
[52] U.S. Cl. .................................. 308/207 R; 308/236
[58] Field of Search ............... 308/189 R, 189 A, 197, 308/207 R, 207 A, 236

[56] References Cited

U.S. PATENT DOCUMENTS

| | | | |
|---|---|---|---|
| 2,005,941 | 6/1935 | Johnson | 308/236 |
| 2,565,759 | 8/1951 | Danly et al. | 308/207 R |
| 2,591,622 | 4/1952 | Shoup | 308/207 R |
| 3,107,718 | 10/1963 | Ruple | 308/236 |
| 3,108,839 | 10/1963 | Johnson | 308/207 R |

*Primary Examiner*—Charles E. Frankfort
*Attorney, Agent, or Firm*—Wegner, Stellman, McCord, Wiles & Wood

[57] ABSTRACT

A drive assembly for use in a vehicle, such as a track-type vehicle, having a hub member rotatably carrying an outer member by means of axially inner and outer bearings. The bearings are arranged to be aligned with the inner bearing races being pressed onto the hub member and into the outer member, respectively, and the outer bearing races being pressed onto a bearing retainer and into the outer member, respectively. A sleeve may be provided between the hub member and outer member intermediate the inner and outer bearings. The bearing retainer may abut the inner race of the outer bearing with the outer race of the outer bearing abutting an axially outwardly facing shoulder on the outer member.

11 Claims, 3 Drawing Figures

BEARING RETAINER

This is a continuation, of application Ser. No. 800,823 filed May 26, 1977 and now abandoned.

BACKGROUND OF THE INVENTION

1. Field of the Invention

This invention relates to drive assemblies and in particular to the mounting of roller bearings in drive assemblies.

2. Description of the Prior Art

In copending U.S. Letters patent application Ser. No. 696,680 of Gerald E. Whitehurst, filed June 16, 1976, for a Modular Steering Clutch and Brake Pack, now U.S. Pat. No. 4,096,931, and copending U.S. Letters patent application Ser. No. 721,653, filed Sept. 8, 1976, of Robert L. Shelby et al, for a Metering Device for Steering Brake Lube Systems, now abandoned, each of which applications is owned by the assignee hereof, rotative drive assemblies are illustrated for use in a vehicle power drive system. As discussed in said applications, related drive assembly structures are shown in U.S. Pat. Nos. 3,771,627, of Samuel I. Caldwell at al, owned by the assignee hereof, 3,157,257 of Robert S. Root, 3,177,994 of Rowland Jewson, 3,638,773 of William E. Lewis et al, 3,351,169 of Ronald M. McIndoe, 3,547,235 of Hellmut Weinrich, and 3,773,157 of Franklin O. Koch, Jr. et al. Illustrated in these prior art patents are different forms of bearing means for rotatively associating relatively rotatable drive structures.

SUMMARY OF THE INVENTION

The present invention comprehends an improved drive assembly for use in such vehicle power drive systems wherein an improved bearing arrangement is provided.

The bearing arrangement includes an axially inner bearing press mounted between a hub member and an outer member and an axially outer bearing. A bearing retainer is provided for association with the axially outer bearing which is pressed between the outer member and an annular bearing surface of the bearing retainer. The bearing retainer is removably secured to the hub member upon completion of assembly of the bearing means in the drive assembly structure.

A sleeve is disposed between the hub member and outer member and is provided with suitable oil passages and annular seals. The sleeve has an axial length less than the desired spacing between the bearings. The seals on the retainer may be serviced by removal of the retainer while retaining the outer race of the outer bearing pressed into the outer member thereby facilitating servicing of the mechanism.

The inner race of the outer bearing is pressed into the bearing retainer.

The improved bearing arrangement permits facilitated installation of the bearings in that only one set of rollers need be aligned at a time during the assembly. As the sleeve is a separate element, facilitated servicing thereof and optimum life is provided.

Thus, the drive assembly structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
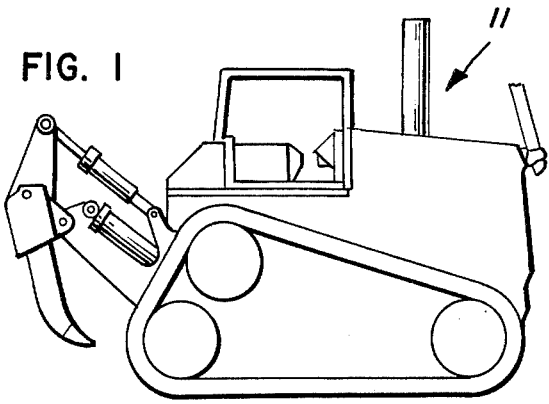
FIG. 1 is a side elevation of a tractor vehicle having a drive assembly structure embodying the invention.

In the exemplary embodiment of the invention as disclosed in the drawing, an improved drive assembly structure generally designated 10 is shown for use in a vehicle, such as a track-type vehicle, 11 illustrated in FIG. 1. Reference may be had to copending applications, Ser. Nos. 696,680 of Gerald E. Whitehurst, and 721,653, of Robert L. Shelby et al, referred to above, for a detailed description of the overall drive assembly. For purposes of the present invention, however, reference will be had only to the drive assembly structure illustrated in FIGS. 2 and 3 of the present drawing.

Figure 2:
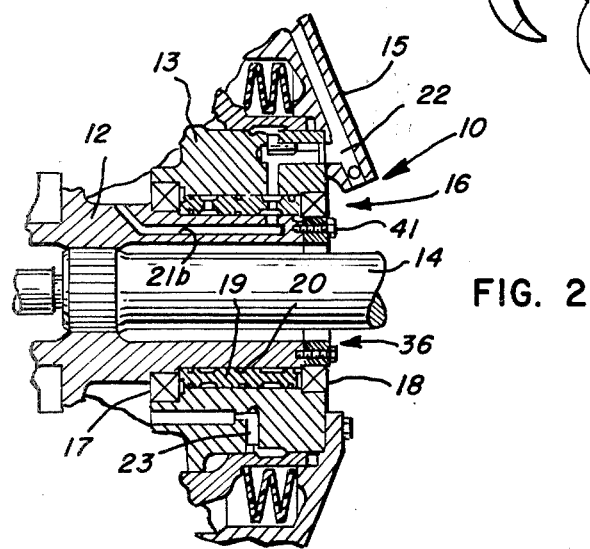
FIG. 2 is a fragmentary vertical section illustrating a portion of the power drive system of the vehicle provided with the improved drive assembly structure of the invention.

More specifically, the present invention is concerned with the means for rotatably associating a hub member 12 with an outer member 13 which may illustratively comprise an actuator piston retainer. As shown in FIG. 2, the hub member 12 may be mounted to an output shaft 14 for rotation therewith. Outer member 13 may be carried by a brake pack housing 15.

The present invention is concerned with the bearing means generally designated 16. As shown in FIG. 2, the bearing means includes an axially inner roller bearing 17 and an axially outer roller bearing 18. Intermediate the bearings 17 and 18 is a sleeve 19 carrying a plurality of seals 20 and having a number of oil passages 21 and grooves 21A. Pressurized oil may be delivered to the grooves 21A from a supply passage 22 in housing 15 through a transfer passage 23 in the outer member 13, as shown in FIG. 2. Grooves 21A deliver the oil into passages 21B in hub 12 where it may be distributed to an open area for cooling clutches, etc.

Figure 3:
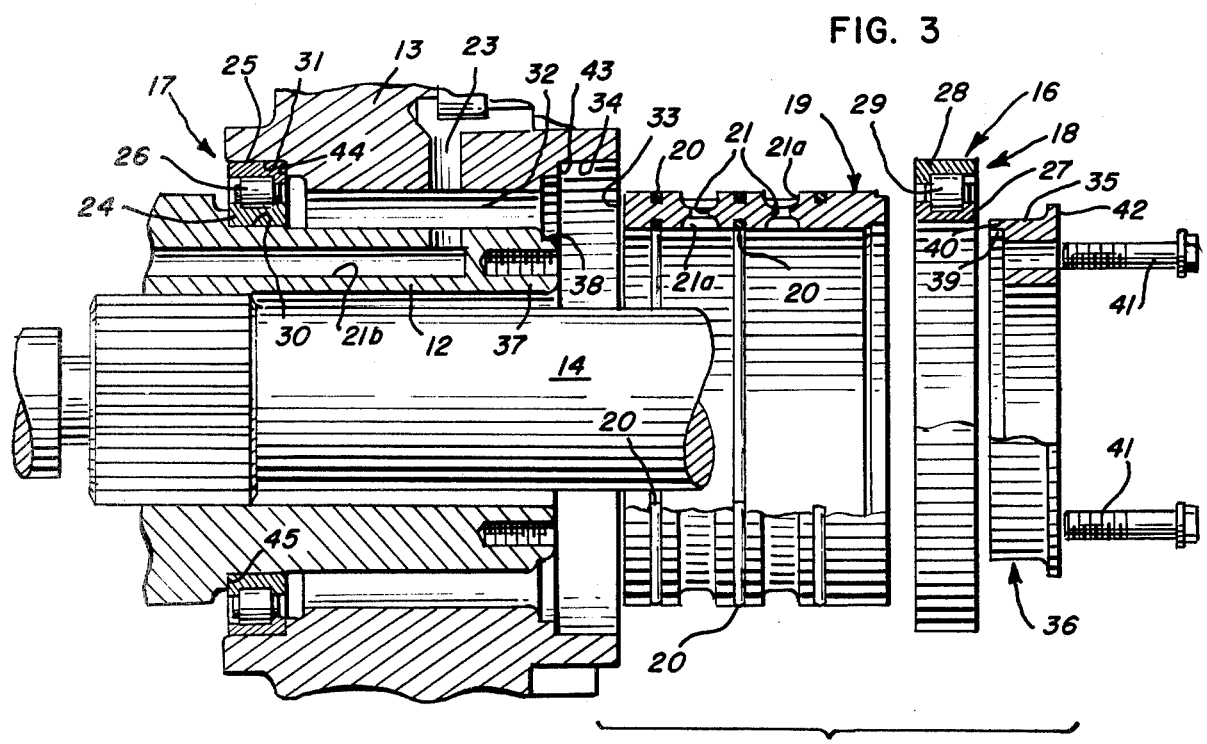
FIG. 3 is an exploded enlarged diametric section illustrating the components of the drive assembly structure in greater detail.

The assembly of bearing means 16 in the drive assembly 10 is illustrated in FIG. 3. As shown therein, inner bearing 17 includes an inner race 24, an outer race 25, and rollers 26. Outer bearing 18 includes an inner race 27, an outer race 28, and rollers 29.

Inner bearing inner race 24 is pressed into an annular surface 30 of the hub member 12 and outer race 25 of the inner bearing 17 is pressed into an annular surface 31 of the outer member 13. The rollers 26 may be aligned with the race 24 prior to installation of the race.

The sleeve 19 provided with the sealing rings 20 is axially inserted through the space 32 until the inner end 33 of the sleeve abuts the inner race 24 of bearing 17, as shown in FIG. 2. Such installation may be carefully effected so as to avoid damage to the bearing 17 with the separable construction of the sleeve permitting such facilitated damage-free installation.

Upon installation of the seal sleeve 19 within the space 32, the outer bearing 18 may be installed. More specifically, the outer race 28 may be pressed into an annular surface 34 of the outer member 13 and the inner race 27 may be pressed onto an annular surface 35 of an annular bearing retainer 36. The outer end 37 of the hub member 12 may be provided with a guide surface 38 cooperating with a complementary guide surface 39 at the inner end 40 of the bearing retainer 36 so as to coaxially mount the bearing retainer to the outer end 37 of the hub member with the bearing races 27 and 28 accurately coaxially related. The rollers 29 may previously be installed in the bearing race 27.

The bearing retainer 36 may be removably secured to the outer end 37 of the hub member by suitable bolts 41. As shown in FIG. 3, the bearing retainer may be provided with an outer flange 42 abutting the outer bearing inner race 27 to prevent outward displacement of the inner race in the assembled arrangement of the outer bearing 18. As further shown in FIG. 3, the outer member 13 further defines a radial shoulder 43 at the inner end of surface 34 for limiting the inward movement of outer race 28 relative to the outer member 13. The outer member 13 further defines axially inwardly facing shoulder 44 at the inner end of surface 31 for limiting the inward movement of the outer race 25 of bearing 17. As further shown in FIG. 3, hub member 12 may be provided with an axially outwardly facing shoulder 45 abutted by the inner race 24 of the inner bearing 17 whereby the inner race 24 is effectively captured between shoulder 45 and the inner end 33 of seal sleeve 19.

The improved bearing arrangement of the present invention permits simplified assembly by permitting the alignment of the rollers of bearings 17 and 18 independently. Further, as the sealing sleeve 19 is readily removable from the space 32 upon removal of the bearing retainer 36 to which the inner race 27 is press mounted, and the rollers 29, facilitated servicing of the seal 20 may be effected without requiring the removal of the outer race 28 or the removal of the inner race 27 from the bearing retainer. The rollers 29 may be readily realigned upon reassembly of the bearing 18 upon completion of servicing of the seal 20 and reinstallation of the sleeve 19 in space 32. As the sleeve 19 is a separable element, long troublefree life of the seal 20 is provided.

The foregoing disclosure of specific embodiments is illustrative of the broad inventive concepts comprehended by the invention.

The embodiments of the invention in which an exclusive property or privilege is claimed are defined as follows:

1. In a drive assembly having a hub member, and an annular outer member, improved means for rotatably mounting said outer member coaxially about the hub member comprising:

an annular axially inner bearing having an inner race press mounted on said hub member and an outer race mounted to said outer member;

an annular axially outer bearing;

a bearing retainer having an annular bearing surface coaxially disposed within said outer member, said outer bearing comprising a roller bearing having radially inner and outer races, said outer bearing inner race being press mounted solely onto said annular bearing surface of said bearing retainer and said outer bearing outer race being mounted in said outer member;

a sleeve member disposed coaxially between said hub member and outer member;

annular sealing means coaxially on said sleeve member for sealing said sleeve member to said hub member and outer member axially intermediate said bearings, said sleeve member being axially captured between said inner bearing inner race and said outer bearing inner race whereby said sleeve may be removed from between said hub member and outer member for servicing said sealing means upon removal of said bearing retainer with said outer bearing inner race while said outer bearing outer race is maintained mounted in said outer member; and securing means for removably securing said bearing retainer coaxially to said hub member.

2. The drive assembly of claim 1 wherein said bearing retainer is provided with an axially outer flange for retaining said outer bearing against axially outward displacement.

3. The drive assembly of claim 1 wherein said outer member is provided with an axially outwardly facing shoulder engaged by said outer bearing for retaining the outer bearing against axially inward displacement.

4. The drive assembly of claim 1 wherein said securing means comprise removable threaded securing means.

5. The drive assembly of claim 1 wherein said sleeve member is spaced from said outer bearing.

6. The drive assembly of claim 1 wherein said sleeve member has an axial length less than the axial spacing between said inner and outer bearings inner races.

7. The drive assembly of claim 1 wherein said outer member defines an axially inner, axially inwardly facing radial shoulder abutted by said outer race of the inner bearing and an axially outer, axially outwardly facing shoulder abutted by said outer race of the outer bearing.

8. The drive assembly of claim 1 wherein said outer member defines an axially inner, axially inwardly facing radial shoulder abutted by said outer race of the inner bearing and an axially outer, axially outwardly facing shoulder abutted by said outer race of the outer bearing, said hub member defining an axially inner, axially outwardly facing shoulder abutted by said inner race of the inner bearing.

9. The drive assembly of claim 1 wherein said outer member defines an axially inner, axially inwardly facing radial shoulder abutted by said outer race of the inner bearing and an axially outer, axially outwardly facing shoulder abutted by said outer race of the outer bearing, said bearing retainer defining an axially outer, axially inwardly facing shoulder abutting said inner race of the outer bearing.

10. The drive assembly of claim 1 wherein said outer member defines an axially inner, axially inwardly facing radial shoulder abutted by said outer race of the inner bearing and an axially outer, axially outwardly facing shoulder abutted by said outer race of the outer bearing, said sleeve member being axially movable through said outer bearing outer race carried by said outer member upon disassembly of said outer bearing.

11. The drive assembly of claim 1 wherein said bearings comprise roller bearings having rollers installed in aligned relationship to said races subsequent to the press mounting of the races in the drive assembly.

* * * * *